(12) United States Patent
Sadler

(10) Patent No.: US 10,326,350 B2
(45) Date of Patent: Jun. 18, 2019

(54) APPARATUS FOR A MOTOR WITH OSCILLATING MAGNET

(71) Applicant: Lawrence R. Sadler, Palmetto, FL (US)

(72) Inventor: Lawrence R. Sadler, Palmetto, FL (US)

(73) Assignee: L.R.S. Innovations, Inc., Palmetto, FL (US)

( * ) Notice: Subject to any disclaimer, the term of this patent is extended or adjusted under 35 U.S.C. 154(b) by 279 days.

(21) Appl. No.: 15/263,163

(22) Filed: Sep. 12, 2016

(65) Prior Publication Data

US 2017/0077781 A1 Mar. 16, 2017

Related U.S. Application Data

(60) Provisional application No. 62/217,267, filed on Sep. 11, 2015.

(51) Int. Cl.
*H02K 53/00* (2006.01)
*H02K 7/06* (2006.01)
*H02K 49/10* (2006.01)

(52) U.S. Cl.
CPC .................................. *H02K 53/00* (2013.01)

(58) Field of Classification Search
CPC .......... H02K 53/00; H02K 7/06; H02K 7/065; H02K 49/10; H02K 49/104; H02K 49/106; H02K 49/108
USPC ...................................................... 310/36, 37
See application file for complete search history.

(56) References Cited

U.S. PATENT DOCUMENTS

| | | | |
|---|---|---|---|
| 3,096,452 A | 7/1963 | Haydon | |
| 3,670,189 A | 6/1972 | Monroe | |
| 4,128,020 A * | 12/1978 | Gray | F16F 15/30 310/153 |
| 4,196,365 A * | 4/1980 | Presley | H02K 9/10 310/103 |
| 5,514,923 A | 5/1996 | Gossler et al. | |
| 5,860,321 A * | 1/1999 | Williams | F16H 33/08 74/143 |
| 5,925,958 A | 7/1999 | Pirc | |
| 6,930,421 B2 | 8/2005 | Wise | |
| 7,105,972 B2 | 9/2006 | Gallant | |
| 7,148,596 B2 | 12/2006 | Minato et al. | |
| 7,151,332 B2 | 12/2006 | Kundel | |
| 7,893,570 B2 | 2/2011 | Redinbo | |
| 7,969,055 B2 | 6/2011 | Titus | |
| 8,138,696 B2 | 3/2012 | Vanderelli et al. | |
| 8,193,669 B2 | 6/2012 | Palmer, Jr. et al. | |
| 8,400,037 B2 | 3/2013 | Wojtowicz | |
| 8,618,702 B2 * | 12/2013 | Iijima | H02K 35/02 310/12.24 |
| 9,413,214 B2 * | 8/2016 | Giummo | H02K 21/00 |

(Continued)

*Primary Examiner* — Jeremy A Luks
(74) *Attorney, Agent, or Firm* — Kunzler Bean & Adamson

(57) ABSTRACT

An apparatus is disclosed. The apparatus may include a pulse device that may include a magnet. The pulse device may be configured to move the magnet in a reciprocating motion. The apparatus may include a magnet wheel that may include a magnet. A magnetic field produced by the magnet of the pulse device may repulse the magnet of the magnet wheel and turn the magnet wheel. The apparatus may include an axle connected to the magnet wheel. The axle may rotate in response to the magnet wheel turning. A system and method are also disclosed.

18 Claims, 9 Drawing Sheets

(56) References Cited

U.S. PATENT DOCUMENTS

| | | | |
|---|---|---|---|
| 2002/0097013 A1* | 7/2002 | Bedini | H02K 21/24 |
| | | | 318/139 |
| 2003/0234590 A1 | 12/2003 | Gizen et al. | |
| 2007/0120432 A1* | 5/2007 | Vaden | F01B 3/007 |
| | | | 310/80 |
| 2007/0210665 A1* | 9/2007 | Moe | H02K 9/10 |
| | | | 310/180 |
| 2007/0222309 A1 | 9/2007 | Minker | |
| 2007/0228856 A1 | 10/2007 | Bates et al. | |
| 2008/0111432 A1* | 5/2008 | Froelich | H02K 53/00 |
| | | | 310/37 |
| 2008/0164778 A1 | 7/2008 | Schieffer | |
| 2011/0095544 A1 | 4/2011 | Fijalkowski | |
| 2012/0062048 A1* | 3/2012 | Kaneko | H02K 7/06 |
| | | | 310/20 |
| 2012/0153758 A1 | 6/2012 | Perry | |

\* cited by examiner

APPARATUS FOR A MOTOR WITH OSCILLATING MAGNET

FIELD

This invention relates to electric motors and more particularly relates to a motor with an oscillating magnet.

BACKGROUND

Motors and engines are commonly used to convert energy into motion. Motors and engines use various amounts of energy to create this motion. There is a large demand for efficient motors and engines.

SUMMARY OF THE INVENTION

In one embodiment, an apparatus is disclosed. The apparatus may include a pulse device that may include a magnet. The pulse device may be configured to move the magnet in a reciprocating motion. The apparatus may include a magnet wheel that may include a magnet. A magnetic field produced by the magnet of the pulse device may repulse the magnet of the magnet wheel and turn the magnet wheel. The apparatus may include an axle connected to the magnet wheel. The axle may rotate in response to the magnet wheel turning.

In one embodiment, the pulse device may include an oscillator, a shaft coupled to the oscillator, and a lever including a first end and a second end. The first end may couple to the shaft and the second end may couple to the magnet of the pulse device. In one embodiment, the magnet of the magnet wheel may include a shield that may cover a portion of a surface of the magnet.

In one embodiment, a magnetic field produced by a magnet of the pulse device repulses the magnet of the magnet wheel in response to the magnet of the pulse device moving into a proximity of the magnet of the magnet wheel.

In one embodiment, the apparatus may include a sensor device that may include a trigger wheel connected to the axle. The trigger wheel may include a magnet disposed a surface of the trigger wheel. The apparatus may include a sensor plate that may include a sensor that detects a proximity of a magnet of the trigger wheel. In one embodiment, the apparatus may include a timing control connected to the sensor device. The timing control may be configured to detect, from the sensor device, a rotational speed of the axle.

In one embodiment, the timing control, in response to detecting the rotational speed of the axle, may be configured to adjust a speed of the reciprocating motion of the pulse device, or a speed of rotation of a timing wheel connected to the axle. The timing wheel may be to adjust the speed of rotation of the axle in response to the timing control adjusting the speed of rotation of the timing wheel. In one embodiment, the apparatus may include a generator connected to the axle.

In one embodiment, a system is disclosed. The system may include a pulse device that may include a magnet. The pulse device may be configured to move the magnet in a reciprocating motion. The system may include a magnet wheel that may include a magnet. A magnetic field produced by the magnet of the pulse device may repulse the magnet of the magnet wheel and may turn the magnet wheel. The system may include an axle connected to the magnet wheel that may rotate in response to the magnet wheel turning. The system may include a sensor device that may include a trigger wheel connected to the axle. The trigger wheel may include a magnet disposed a surface of the trigger wheel. The sensor device may include a sensor plate that may include a sensor that may detect a proximity of the magnet of the trigger wheel. The system may include a timing control connected to the sensor device. The timing control may be configured to detect, from the sensor device, a rotational speed of the axle.

In one embodiment, the pulse device may include an oscillator, a shaft coupled to the oscillator, and a lever that may include a first end and a second end. The first end may couple to the shaft and the second end may couple to the magnet of the pulse device. In one embodiment, the magnet of the magnet wheel may include a shield that covers a portion of the surface of the magnet and a neodymium magnet.

In one embodiment, a magnetic field produced by magnet of the pulse device may repulse the magnet of the magnet wheel in response to the magnet of the pulse device moving into a proximity of the magnet of the magnet wheel. In one embodiment, the timing control, in response to detecting the rotational speed of the axle, may be configured to adjust a speed of the reciprocating motion of the pulse device or a speed of rotation of a timing wheel connected to the axle. The timing wheel may be configured to adjust the speed of rotation of the axle in response to the timing control adjusting the speed of rotation of the timing wheel. In one embodiment, the system may include a generator connected to the axle.

In one embodiment, a method is disclosed. The method may include providing a pulse device comprising a magnet. The method may include providing a magnet wheel comprising a magnet. The method may include providing an axle connected to the magnet wheel. The method may include moving the magnet of the pulse device in a reciprocating motion. The method may include repulsing, in response to moving the magnet of the pulse device, the magnet of the magnet wheel. The method may include rotating the axle in response to the magnet wheel rotating.

In one embodiment, the pulse device may include an oscillator, a shaft coupled to the oscillator, and a lever that may include a first end and a second end. The first end may couple to the shaft and the second end may couple to the magnet of the pulse device. In one embodiment, moving the magnet of the pulse device in a reciprocating motion may include moving the shaft in a reciprocating motion, in response to the shaft moving in a reciprocating motion, moving the lever in a pivoting motion, and in response to the lever moving in a pivoting motion, moving a magnetic field produced by the magnet of the pulse device into the magnetic field of the magnet of the magnet wheel. In one embodiment, repulsing the magnet of the magnet wheel may include moving the magnetic field of the magnet of the pulse device into the magnetic field of the magnet of the magnet wheel.

In one embodiment, the method may include providing a sensor device that may include trigger wheel connected to the axle. The trigger wheel may include a magnet disposed on a surface of the trigger wheel. The sensor device may include a sensor plate comprising a sensor that may detect a proximity of the magnet of the trigger wheel. In one embodiment, in response to a magnet of the trigger wheel moving into proximity of the sensor, the method may include detecting a location of the magnet of the trigger wheel.

In one embodiment, the method may include providing a timing control connected to the sensor device and detecting, from one or more detected locations of the magnet of the sensor device, a rotational speed of the axle. In one embodiment, the timing control, in response to detecting the rotational speed of the axle, may adjusts a speed of the reciprocating motion of the pulse device or a speed of rotation of a timing wheel connected to the axle, wherein the timing wheel adjusts the speed of rotation of the axle in response to the timing control adjusting the speed of rotation of the timing wheel.

In one embodiment, the method may include providing a generator connected to the axle and, in response to the axle rotating, generating electricity.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of mechanical structures, electrical devices, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Figure 1:
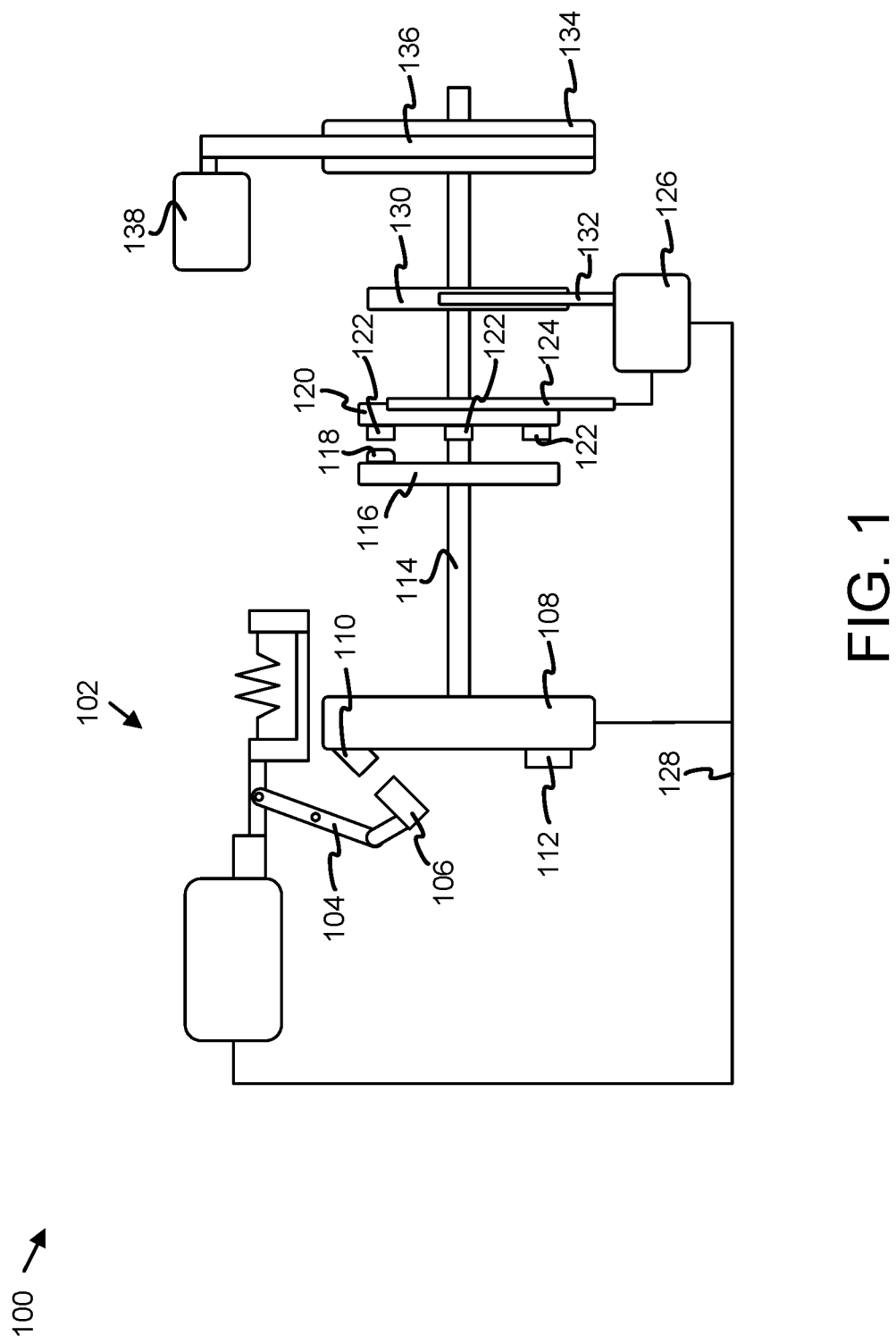
FIG. 1 is a side view illustrating one embodiment of an apparatus for a motor with an oscillating magnet.

FIG. 1 depicts one embodiment of an apparatus 100 for a motor with an oscillating magnet. In one embodiment, the apparatus may include a pulse device 102. In a further embodiment, the apparatus 100 may include a lever 104. In one embodiment, the apparatus may include a shielded magnet 106. In a further embodiment, the apparatus 100 may include a magnet wheel 108. In one embodiment, the apparatus 100 may include one or more wheel magnets 110. In one embodiment, the apparatus 100 may include a counterweight 112. In one embodiment, the apparatus 100 may include an axle 114. In one embodiment, the apparatus 100 may include a trigger wheel 116. In a further embodiment, the apparatus may include one or more sensor triggers 118. In one embodiment, the apparatus 100 may include a sensor plate 120. In a further embodiment, the apparatus 100 may include one or more sensors 122. In one embodiment, the apparatus 100 may include a sensor relay 124. In one embodiment, the apparatus 100 may include a timing control 126. In a further embodiment, the apparatus 100 may include a timing connector 128. In one embodiment, the apparatus 100 may include a timing wheel 130. In a further embodiment, the apparatus 100 may include a timing arm 132. In one embodiment, the apparatus 100 may include a generator wheel 134. In a further embodiment, the apparatus 100 may include a generator belt 136. In one embodiment, the apparatus 100 may include a generator 138.

In one embodiment, the pulse device 102 may pulse. In a further embodiment, the pulse device 102 pulsing may include one or more components of the pulse device 102 moving back-and-forth, moving in a reciprocating motion, moving in an oscillating motion, or the like. In a further embodiment, the pulse device 102 may pulse at a rate of speed. In one embodiment, in response to the pulse device 102 pulsing, the lever 104 may pivot about a fulcrum. In a further embodiment, the lever 104 pivoting may include the shielded magnet 106 moving back-and-forth, moving in a reciprocating motion, moving in an oscillating motion, or the like.

In one embodiment, the shielded magnet 106 moving in a reciprocating motion or the like may move the shielded magnet 106 in a proximity of one or more wheel magnets 110. In one embodiment, the one or more wheel magnets 110 may mount to the magnet wheel 108. In a further embodiment, in response to the shielded magnet 106 moving into a proximity of one or more wheel magnets 110, the shielded magnet 106 may repel the one or more wheel magnets 110. In one embodiment, in response to the repulsion between the shielded magnet 106 and the one or more wheel magnets 110, the magnet wheel 108 may rotate. In a further embodiment, in response to the magnet wheel 108 rotating, the axle 114 may turn, rotate, or the like.

In one embodiment, the magnet wheel 108 may store kinetic energy as momentum. The magnet wheel 108 may act as a flywheel. In one embodiment, the magnet wheel 108 storing kinetic energy may allow the axle 114 to continue to turn for a period of time even if the axle 114 does not receive power. For example, in one embodiment, the pulse device 102 may not pulse and the magnet wheel 108 may not rotate. In another embodiment, for example, the generator 138 may not drive the generator belt 136 or the generator wheel 134 and turn the axle 114 (discussed below). In a further embodiment, the magnet wheel 108 may rotate and turn the axle 114 in response to the magnet wheel 108 storing momentum. In a further embodiment, the magnet wheel 108 may provide substantially continuous or constant energy to the rotation of the axle in response to the rotation of the magnet wheel being variable. In one embodiment, the magnet wheel 108 may provide the axle 114 a burst of energy. In a further embodiment, in response to a burst of energy released by the magnet wheel 108, the axle 114 may rotate faster.

In one embodiment, the axle 114 may be at a state of rest, not be rotating, or the like. In a further embodiment, the magnet wheel 108 may begin rotating and, in response, the axle 114 may begin to rotate. For example, in one embodiment, the magnet wheel 108 may rotate in response to receiving a signal from the timing control 126 (as discussed below). In another embodiment, the magnet wheel 108 may connect to a battery or other power source and, in response to receiving power from the battery or other power source, the magnet wheel may rotate. In one embodiment, one or more other components of the apparatus 100 may begin to rotate the axle 114 in response to the magnet wheel 108 rotating at 0.5 to 1 RPM. For example, in a further embodiment, in response to the magnet wheel 108 turning and rotating the axle 114, the pulse device 200 may begin to pulse and drive the magnet wheel 108. In one embodiment, another component of the apparatus, such as the trigger wheel 116, timing wheel 130, generator wheel 134, or the like may receive a signal, power, or the like and begin to rotate the axle 114.

In one embodiment, in response to the axle 114 rotating, the trigger wheel 116 may rotate. In a further embodiment, the trigger wheel 116 may include one or more sensor triggers 118. In one embodiment, the one or more sensor triggers 118 may mount to the trigger wheel 116 and rotate with the trigger wheel 116 in response to the axle 114 rotating. In a further embodiment, in response to the one or more sensor triggers 118 rotating, the one or more sensor triggers 118 may move into a proximity of the one or more sensors 122 of the sensor plate 120. In one embodiment, in response to the one or more sensor triggers 118 moving into a proximity of the one or more sensors 122, the one or more sensors may relay one or more signals to the timing control 126. In a further embodiment, the one or more sensors 122 relaying one or more signals to the timing control 126 may include sending one or more signals through the sensor relay 124.

In one embodiment, the timing control 126 may receive signals from one or more components of the apparatus 100. For example, in one embodiment, the timing control 126 may receive signals from the one or more sensors 122 of the sensor plate 120. The one or more signals from the sensors 122 may include information about the apparatus 100. For example, in one embodiment, the information may include a rotational speed of the axle 114, a rotational speed of the magnet wheel 108, a rotational speed of the trigger wheel 116, or the like. In one embodiment, the timing control 126 may process one or more signals received from one or more components of the apparatus 100. In a further embodiment, in response to the timing control 126 processing one or more signals, the timing control 126 may send one or more signals to one or more components of the apparatus 100. For example, in one embodiment, the timing control 126 may send one or more signals to the magnet wheel 108. In response to the magnet wheel 108 receiving one or more signals from the timing control 126, the magnet wheel 108 may produce a burst of energy and increase the speed of the rotation of the axle 114. In a further embodiment, the timing control 126 may send one or more signals to the pulse device 102. In response to the pulse device 102 receiving one or more signals from the timing control 126, the pulse device 102 may increase or decrease the rate of speed at which the pulse device 102 pulses. In one embodiment, in response to the pulse device 102 receiving one or more signals from the timing control 126, the pulse device 102 may stop pulsing.

In one embodiment, the axle 114 may connect to the timing wheel 130. In a further embodiment, the timing wheel 130 may couple to the timing arm 132. In one embodiment, the timing arm may couple with the timing control 126. In a further embodiment, the timing control 126 may move the timing arm 132 in response to processing one or more signals. In one embodiment, in response to the timing control 126 moving the timing arm 132, the timing control 126 may slow the rotation speed of the axle 114. In one embodiment, in response to the timing control 126 moving the timing arm 132, the timing wheel 130 or the timing arm 132 may increase the rotation speed of the axle 114.

In one embodiment, the generator wheel 134 may couple to the axle 114. In some embodiments, in response to the axle 114 rotating, the generator wheel 134 may rotate. In a further embodiment, the generator wheel 134 rotating may drive the generator belt 136. In one embodiment, in response to the generator wheel 134 driving the generator belt 136, the generator belt 136 may turn a shaft on a generator 138. In a further embodiment, the generator 138 may generate power in response to the generator belt 136 turning a shaft on a generator 138. In one embodiment, the generator 138 may also include a motor. In a further embodiment, the motor may drive the generator belt 136 and, in response, the generator wheel 134 may turn. In some embodiments, the axle 114 may turn in response to the generator wheel 134 turning.

Although FIG. 1 depicts the various components of the apparatus 100 in certain positions along the axle 114, it should not be understood that the components of the apparatus 100 are limited to these positions. The components of the apparatus 100 may be positioned along the axle 114 in several different orders and with varying amounts of space between the various components. Furthermore, the apparatus 100 may include further components not depicted in FIG. 1.

Figure 2:
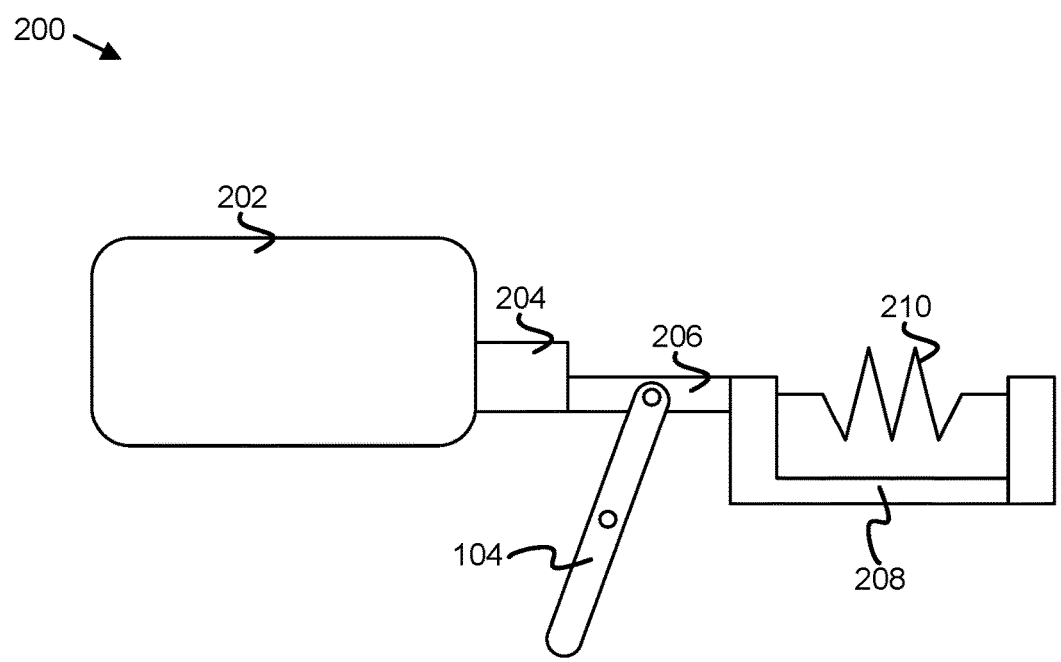
FIG. 2 is a side view illustrating one embodiment of a pulse device.

FIG. 2 depicts one embodiment of a pulse device 200. In one embodiment, the pulse device 200 may include an oscillator 202, a mounting bracket 204, a shaft 206, a spring holder 208, or a tension spring 210.

In one embodiment, the pulse device 200 may include an oscillator 202. The oscillator 202 may include one or more devices, components, or the like that may pulse at a high rate of speed. The pulsing at a high rate of speed may include the one or more devices, components, or the like moving in a linear reciprocating motion at a high rate of speed. For example, in one embodiment, the oscillator 202 may include a linear solenoid. The linear solenoid may include a commercially available linear solenoid. In one embodiment the linear solenoid may include a custom-made solenoid. The solenoid may include a 120 volt solenoid, a 240 volt solenoid, or the like. In one embodiment, the oscillator 202 may include a 400 watt, 4-ohm coil. In one embodiment, the oscillator 202 may include a magnet coil. In one embodiment, the oscillator 202 may produce 20 volts per second. In a further embodiment, the oscillator 202 may pulse up to 50 times per second. In another embodiment, the oscillator 202 may pulse faster than 50 times per second. In a further embodiment, the oscillator 202 may pulse faster than 200 times per second.

The oscillator 202, in one embodiment, may mount to a component external to the pulse device 200, a component external to the apparatus 100, a component of the apparatus 100, or the like. In one embodiment, the oscillator 202 may receive power from one or more cables, wires, or the like. The one or more cables, wires, or the like may couple the oscillator 202 to one or more components of the pulse device 200, one or more components of the apparatus 100, or one or more components external to the apparatus 100.

In one embodiment, the pulse device 200 may include a mounting bracket 204. In one embodiment, the mounting bracket 204 may mount to the oscillator 202. In a further embodiment, the mounting bracket 204 may mount to a shaft 206. In one embodiment, in response to the oscillator 202 pulsing, the mounting bracket 204 may move in a reciprocating motion. In a further embodiment, in response to the mounting bracket 204 moving in a reciprocating motion, the shaft 206 may move in a reciprocating motion.

In one embodiment, the pulse device 200 may include a shaft 206. In one embodiment, the shaft 206 may mount to the mounting bracket 204. In a further embodiment, the shaft 206 may mount to the lever 104. The shaft 206 may mount to the lever 104 in a variety of ways. For example, in one embodiment, the shaft 206 may include an axis and the lever 104 may include an aperture at one end. In a further embodiment, the aperture may fit over the axis and the axis may protrude through the aperture. In one embodiment, the shaft 206 may include a hinge and the lever 104 may mount to the hinge. In other embodiments, the lever 104 may mount to the shaft 206 in others ways that the lever 104 may move in response to the reciprocating motion of the shaft 206.

In one embodiment, the pulse device 200 may include a spring holder 208. In one embodiment, the spring holder 208 may mount to the shaft 206. In a further embodiment, the spring holder 208 may include a flexible material. In a further embodiment, the spring holder 208 may include a bent shape, such as the shape depicted in FIG. 2, or the like. In one embodiment, the shaft 206 moving toward the spring holder 208 in response to the reciprocating motion of the shaft 206 may compress the spring holder 208. In one embodiment, the spring holder 208 may hold the tension spring 210 in place during operation of the pulse device 200. In one embodiment, in response to the shaft 206 moving away from the spring holder 208, the spring holder 208 may decompress.

In one embodiment, the pulse device 200 may include a tension spring 210. In one embodiment, in response to the shaft 206 moving toward the tension spring 210, the tension spring 210 may compress. In one embodiment, the tension spring 210 compressing may store potential energy in the tension spring 210. In a further embodiment, in response to the shaft 206 moving away from the tension spring 210, the tension spring 210 may release the potential energy and convert the potential energy into kinetic energy. In one embodiment, the tension spring 210 may decompress in response to the oscillator 202 ceasing to move the shaft 206 toward the tension spring 210.

In the embodiments discussed above and in other embodiments, the pulse device 200 may pulse at a high rate of speed. For example, in one embodiment, the pulse device 200 may pulse between 50 and 200 pulse cycles per second. In another embodiment, the pulse device 200 may pulse over 200 pulse cycles per second. In one embodiment, the pulse device 200 may pulse at a speed sufficient to turn the axle 114 between 50 and 400 revolutions per minute (RPM). In one embodiment, the pulse device 200 may pulse at a speed sufficient to turn the axle 114 at between 1,800 and 2,100 RPM. In one embodiment, the pulse device 200 may pulse at a speed sufficient to turn the axle 114 at between 2,000 and 15,000 RPM. In some embodiments, the axle 114 may turn at 3500 RPM. In a further embodiment, the pulse device 200 may pulse at a speed sufficient to turn the axle 114 at another number of RPM that the apparatus 100 may be capable of performing without causing significant damage (minus, in some embodiments, normal wear and tear). The number of RPM may depend on a size, weight, composition, or the like of one or more components of the apparatus 100.

In one embodiment, one or more components of the apparatus 100 may determine, at least in part, the rate of speed of the pulsing of the pulse device 200. For example, in a further embodiment, the timing control 126 may send one or more signals to the pulse device 200. In one embodiment, one or more components external to the apparatus 100 may determine, at least in part, the rate of speed of the pulsing of the pulse device 200. For example, in a further embodiment, the pulse device 200 may receive one or more signals from one or more components external to the apparatus 100. In one embodiment, in response to receiving one or more signals, the pulse device 200 may pulse at a higher rate of speed. In another embodiment, in response to receiving one or more signals from the timing control 126, the pulse device 200 may pulse at a lower rate of speed.

Furthermore, in some embodiments, the pulse device 200 may consume little energy. For example, in one embodiment, the pulse device 200 may consume 7 to 12 watts. In another embodiment, the pulse device 200 may consume fewer than 7 watts. In one embodiment, the pulse device 200 may consume more than 12 watts. In one embodiment, the power consumption of the pulse device 200 may depend of the size of the pulse device 200, the size of the apparatus 100, the size of one or more components of the pulse device 200 or the apparatus 100, or the like.

Figure 3:
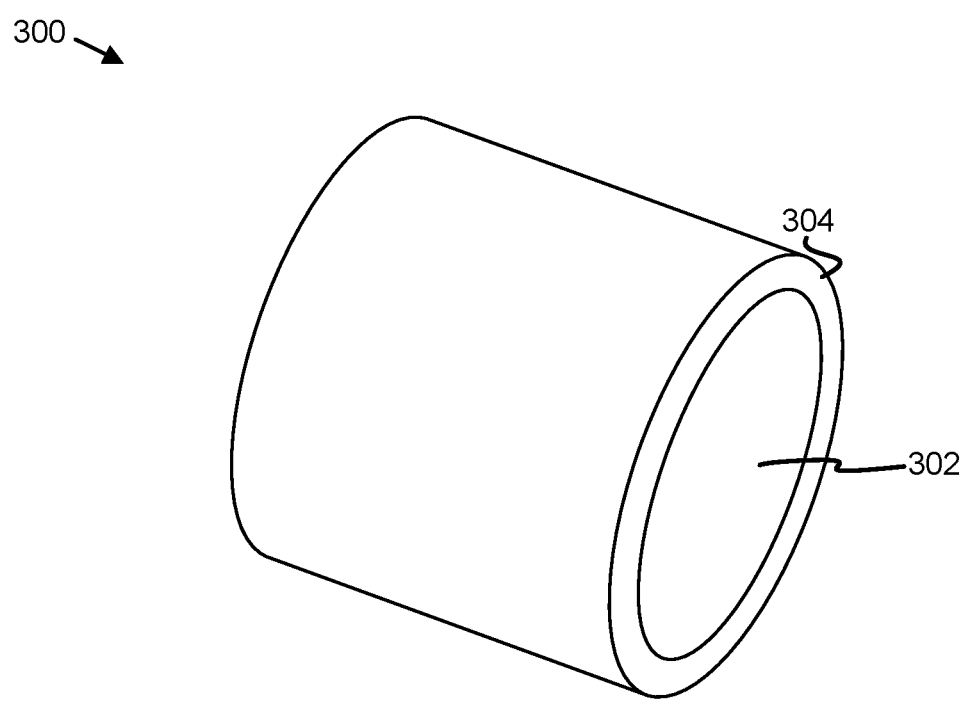
FIG. 3 is a perspective view illustrating one embodiment of a shielded magnet.

FIG. 3 depicts one embodiment of a shielded magnet 300. In one embodiment, the shielded magnet 300 may include a magnet 302. In a further embodiment, the shielded magnet 300 may include shielding 304. In one embodiment, the magnet 302 may include a permanent magnet. As used herein, the term "permanent magnet" includes a magnet that is magnetized and creates a persistent magnetic field. In another embodiment, the magnet 302 may include an electromagnet. In one embodiment, the electromagnet may receiver power from a power source external from the apparatus 100. In one embodiment, the electromagnet may receiver power from a component of the apparatus 100, such as the pulse device 102, the timing control 126, the generator 138, or the like. In one embodiment, the electromagnet may selectively receive power based, at least in part, on one or more signals received by the pulse device 102, the timing control 126, the generator 138, a power source external to the apparatus 100, or the like. In further embodiments, the magnet 302 may include a neodymium magnet ("neo magnet").

In one embodiment, the magnet 302 may include a cylinder shape. In a further embodiment, the magnet 302 may include a rectangular prism shape. In a further embodiment, the magnet 302 may include other shape. In one embodiment, the magnet 302 may include a varying number of sizes, weights, or the like. For example, in one embodiment, the magnet 302 may include a weight of 27 pounds (approx. 12.25 kilograms).

In one embodiment, the shielding 304 may include one or more sheets of material capable of reducing or shielding a magnetic field. For example, in one embodiment, the shielding 304 may include one or more sheets of copper, nickel, aluminum, another metal or alloy, or superconducting material capable of reducing a magnetic field. The shielding 304 may include one or more sheets of metals, alloys, superconducting materials, or materials capable of reducing a magnetic field and which metals, alloys, or materials are not yet known as of filing of this specification. In one embodiment, the shielding 304 may substantially cover the magnet 302 and expose a portion of the magnet 302. For example, as depicted in FIG. 3, the shielding 304 may cover most of the magnet 302 and expose a portion of the magnet 302. In this manner, the magnet 302 may produce a magnetic field in one or more predefined directions.

Figure 4A:
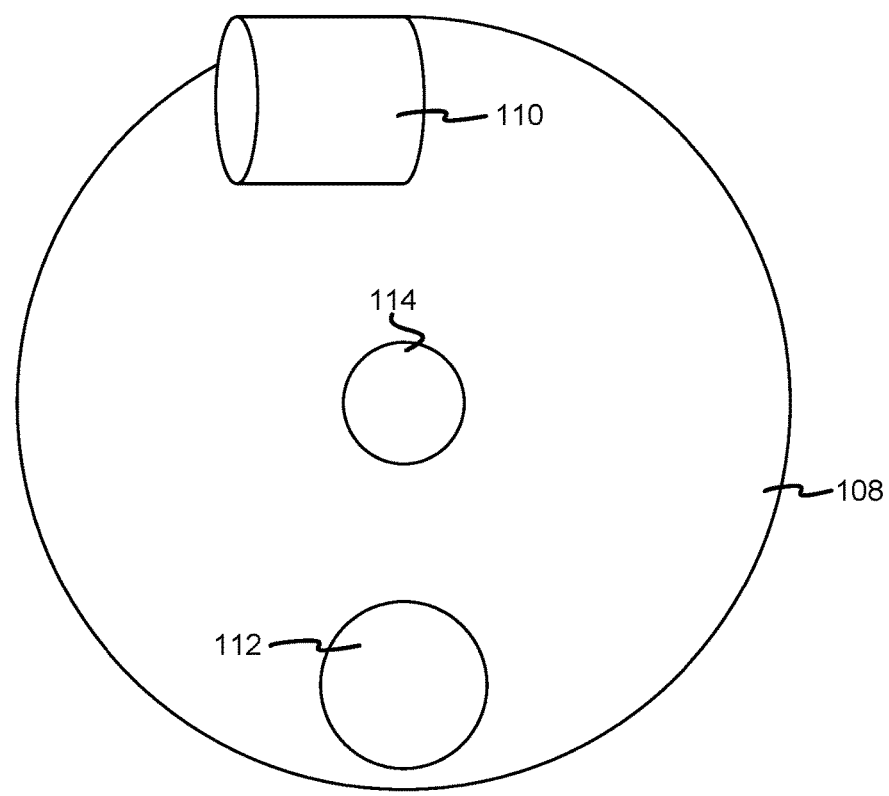
FIG. 4A is a front view illustrating one embodiment of a magnet wheel.

FIG. 4A depicts one embodiment of a magnet wheel 400. In one embodiment, the magnet wheel 400 may include the magnet wheel 108 and one or more wheel magnets 110. In some embodiments, the one or more wheel magnets 110 may include one or more shielded magnets, such as a shielded magnet 300 of FIG. 3. In a further embodiment, the axle 114 may protrude from an aperture in the magnet wheel 108. Although the magnet wheel 400 as depicted in FIG. 4A includes one wheel magnet 110, the magnet wheel 400 may include one or more wheel magnets 110. Furthermore, the one or more wheel magnets 110 may mount at varying location on the magnet wheel 108. For example, in one embodiment, the one or more wheel magnets 110 may mount to an edge a face of the magnet wheel 108, as depicted in FIG. 4A. In another embodiment, the one or more wheel magnets 110 may mount to another area of the magnet wheel 108.

In one embodiment, the magnet wheel 400 may include one or more counterweights 112. The one or more counterweights 112 may balance the magnet wheel 108. Balancing the magnet wheel 108 may include the one or more counterweights 112 counteracting the weight of the one or more wheel magnets 110. A balanced magnet wheel 108 may include a magnet wheel 108 that includes a center of mass at the center of the wheel. In one embodiment, a counterweight 112 may be mounted to the magnet wheel 108. In one embodiment, the magnet wheel 108 may be cast, molded, constructed, or the like to include a counterweight 112 that counters the weight of the one or more shielded wheel magnets 110.

Figure 4B:
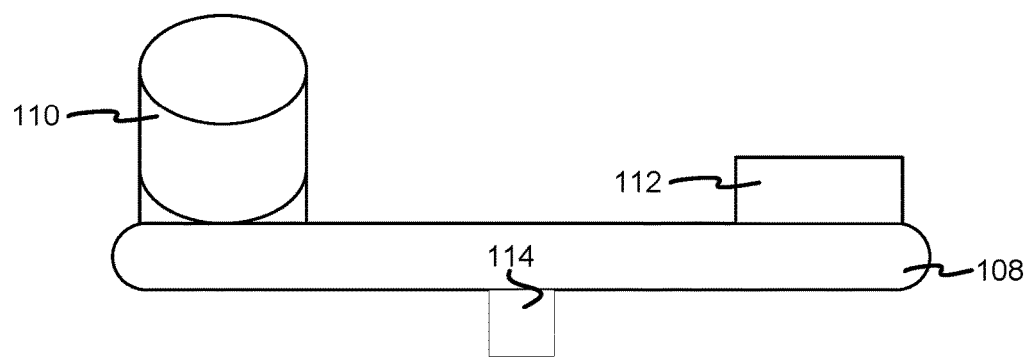
FIG. 4B is a side view illustrating a further embodiment of a magnet wheel.

FIG. 4B depicts a further embodiment of the magnet wheel 400. In one embodiment, the one or more wheel magnets 110 may mount to the magnet wheel 108 at an angle to the magnet wheel 108. The one or more wheel magnets 110 may mount to the magnet wheel 108 at varying angles. For example, as depicted in FIG. 4B, in one embodiment, the one or more shielded magnets may mount to the magnet wheel 108 at a 45 degree angle. In one embodiment, the one or more wheel magnets 110 may mount to the magnet wheel 108 at different angles from the other one or more wheel magnets 110. In one embodiment, the one or more wheel magnets 110 may be adjustable and the angles of the one or more wheel magnets 110 may change. In a further embodiment, the one or more wheel magnets 110 may include a base and the base may mount to the magnet wheel 108.

Figure 5A:
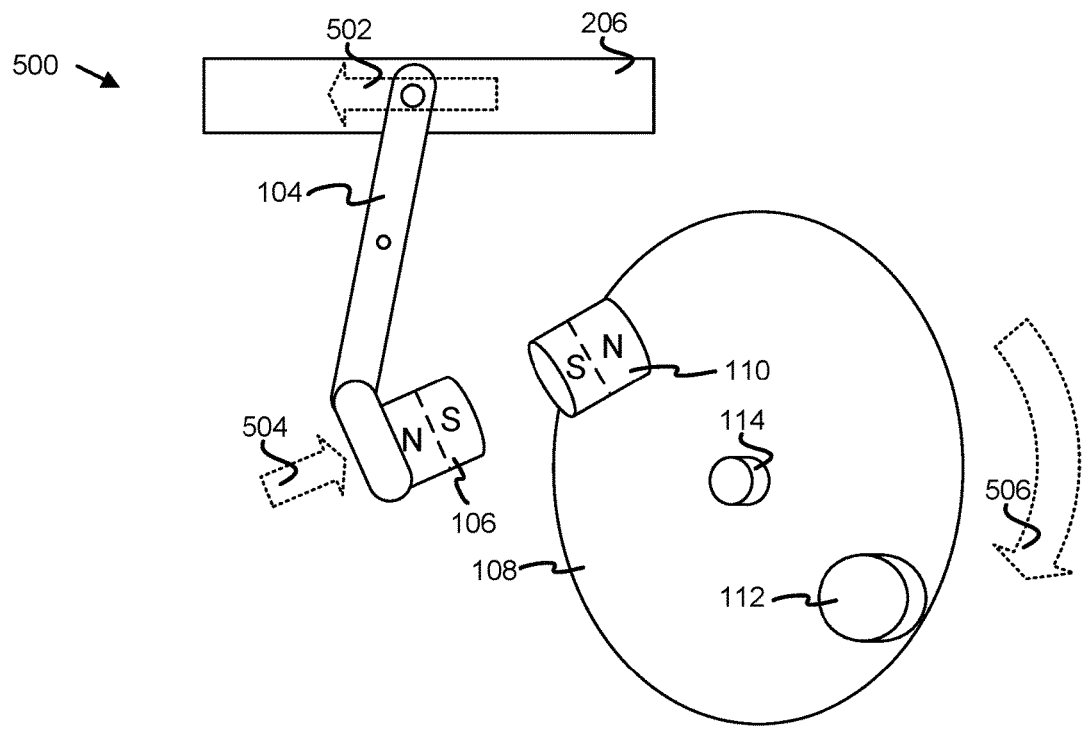
FIG. 5A is a perspective view illustrating one embodiment of a lever interacting with a magnet wheel.

FIG. 5A depicts one embodiment of a system 500 for a motor with an oscillating magnet. In one embodiment, the system 500 may include a lever 104 interacting with a magnet wheel 108. In one embodiment, the lever 104 may include the lever 104 and the shielded magnet 106 of FIG. 1. In a further embodiment, the magnet wheel may include a magnet wheel 400 of FIG. 4A and FIG. 4B or the magnet wheel 108 (which may include the one or more wheel magnets 110) of FIG. 1.

In one embodiment, the lever 104 may connect to a component of the pulse device 200 of FIG. 2, such as the shaft 206. In one embodiment, the shaft 206 may move in a direction away from the magnet wheel 108. For example, as shown in FIG. 5A by the dotted arrow 502, the shaft 206 may move away from the magnet wheel 108. In a further embodiment, in response to the shaft 206 moving away from the magnet wheel 108, the lever 104 may pivot about a fulcrum. In one embodiment, the shielded magnet 106 may mount to an end of the lever 104. In a further embodiment, in response to the lever 104 pivoting about the fulcrum, the shielded magnet 106 may move toward one or more of the wheel magnets 110 of the magnet wheel 108. For example, as depicted in FIG. 5A by the dotted arrow 504, in one embodiment, the shielded magnet 106 may move toward one or more of the wheel magnets 110.

In one embodiment, in response to the shielded magnet 106 moving toward one or more of the wheel magnets 110, the magnetic field produced by the shielded magnet 106 and the one or more magnetic fields produced by the one or more wheel magnets 110 may repulse one another. For example, as depicted in FIG. 5A, in one embodiment, the shielded magnet 106 and the one or more wheel magnets 110 may include a north pole and a south pole. Opposite poles (i.e. north and south) attract each other while similar poles (i.e. north and north, or, south and south) repel each other. In one embodiment, for example, as shown in FIG. 5A, the shielded magnet 106 may include a north pole and a south pole and the south pole may face toward the magnet wheel 108. In a further embodiment, the one or more wheel magnets 110 may include a north pole and south pole. In one embodiment, for example, as shown in FIG. 5A, the south pole of the one or more wheel magnets 110 may face the shielded magnet 106. The orientations of the magnetic poles of the shielded magnet 106 or the one or more wheel magnets 110 are not limited to this embodiment. In one embodiment, the north pole of the shielded magnet 106 and the north pole of the one or more wheel magnets 110 may face each other.

In one embodiment, in response to the repulsion of the magnetic fields produced by the shielded magnet 106 and the one or more shielded magnet wheels 110, the magnet wheel 108 may turn, as shown by the dotted arrow 506. Although FIG. 5A depicts the magnet wheel 108 turning clockwise, the magnet wheel 108 is not limited to this embodiment. In one embodiment, the magnet wheel may turn counter-clockwise. In a further embodiment, in response to the magnet wheel 108 turning, the axle 114 may rotate. In another embodiment, the magnetic pole of the shielded magnet 106 and the magnetic pole of the one or more wheel magnets 110 may include opposite magnetic poles. For example, in one embodiment, the north pole of the shielded magnet 106 may face the south pole of the one or more wheel magnets 110 (or vice versa). In a further embodiment, in response to the shielded magnet 106 moving toward one or more of the wheel magnets 110, the magnetic field produced by the shielded magnet 106 and the one or more magnetic fields produced by the one or more wheel magnets 110 may attract one another. In one embodiment, in response to the attraction of the magnetic fields produced by the shielded magnet 106 and the one or more shielded magnet wheels 110, the magnet wheel 108 may turn. In a further embodiment, in response to the magnet wheel 108 turning, the axle 114 may rotate.

Figure 5B:
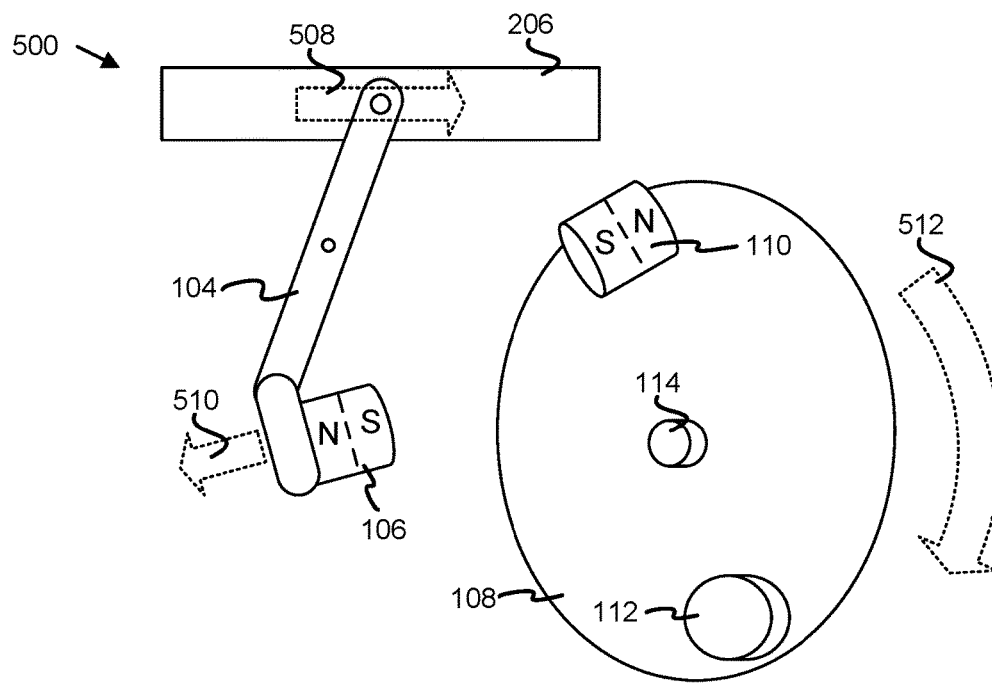
FIG. 5B is a perspective view illustrating a further embodiment of a lever interacting with a magnet wheel.

FIG. 5B depicts one embodiment of a system 500 for a motor with an oscillating magnet. In one embodiment, the system 500 may include a lever 104 interacting with a magnet wheel 108. In one embodiment, the shaft 206 may move in a direction toward the magnet wheel 108. For example, as shown in FIG. 5B by the dotted arrow 508, the shaft 206 may move toward the magnet wheel 108. In a further embodiment, in response to the shaft 206 moving toward the magnet wheel 108, the lever 104 may pivot about a fulcrum. In one embodiment, the shielded magnet 106 may mount to an end of the lever 104. In a further embodiment, in response to the lever 104 pivoting about the fulcrum, the shielded magnet 106 may move away from one or more of the wheel magnets 110 of the magnet wheel 108. For example, as depicted in FIG. 5B by the dotted arrow 510, in one embodiment, the shielded magnet 106 may move away from one or more of the wheel magnets 110.

In one embodiment, in response to the shielded magnet 106 moving away from the one or more wheel magnet 110, the shielded magnet 106 and the one or more wheel magnets 110 may cease to interact or their interaction may be reduced. For example, in one embodiment, the magnetic field produced by the shielded magnet 106 and the magnetic fields produced by the one or more wheel magnets 110 may move out of a proximity of one another. In a further embodiment, in response to the magnetic fields moving out of a proximity of one another, the magnet wheel 108 may turn and move a second wheel magnet 110 into a position where the shielded magnet 106 may move toward the second wheel magnet 110 and interact with a second wheel magnet 110.

In some embodiments, the process of the shielded magnet 106 moving toward a wheel magnet 110, the shielded magnet 106 interacting with the wheel magnet 110, the shielded magnet 106 moving away from the wheel magnet 110, the shielded magnet 106 and wheel magnet ceasing to interact, and the magnet wheel 108 moving a second wheel magnet 110 into a position to interact with the shielded magnet 106, may repeat. In a further embodiment, the process may repeat multiple times.

Figure 6A:
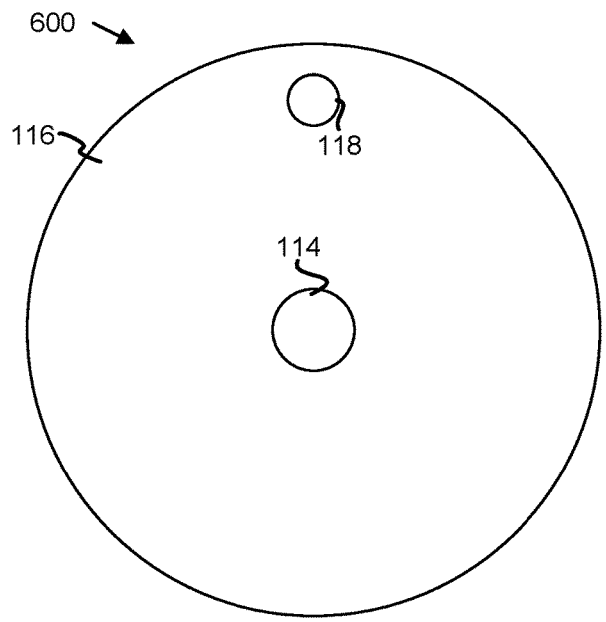
FIG. 6A is a front view illustrating one embodiment of a trigger wheel.
Figure 6B:
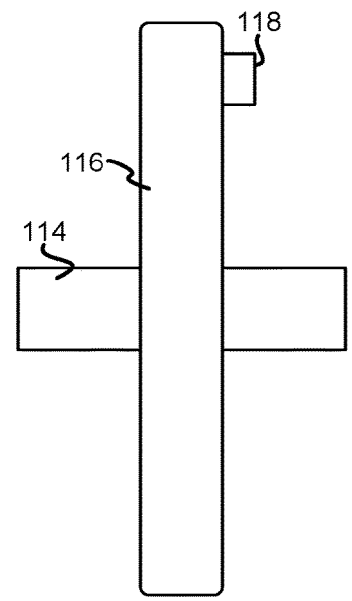
FIG. 6B is a side view illustrating a further embodiment of a trigger wheel.

FIGS. 6A and 6B depict embodiments of a trigger wheel 600. In one embodiment, the trigger wheel 600 may include the trigger wheel 116 and one or more sensor triggers 118. In a further embodiment, the trigger wheel 116 may include an aperture and the axle 114 may protrude through the axle. In one embodiment, in response to the axle rotating, the trigger wheel 116 may turn. In one embodiment, the sensor trigger 118 may include a magnet, such as a permanent magnet, an electromagnet, a neodymium magnet, or the like. In one embodiment, the sensor trigger 118 may include a shielded magnet, such as the shielded magnet 300 of FIG. 3. In another embodiment, the sensor trigger 118 may include an unshielded magnet. In one embodiment, the sensor trigger 118 may mount to the trigger wheel 116. In another embodiment, the sensor trigger 118 may be built into or be part of the trigger wheel 116. In another embodiment, the sensor trigger 118 may include a material, device, or the like, that the one or more sensors 122 (described below) may sense.

Figure 7A:
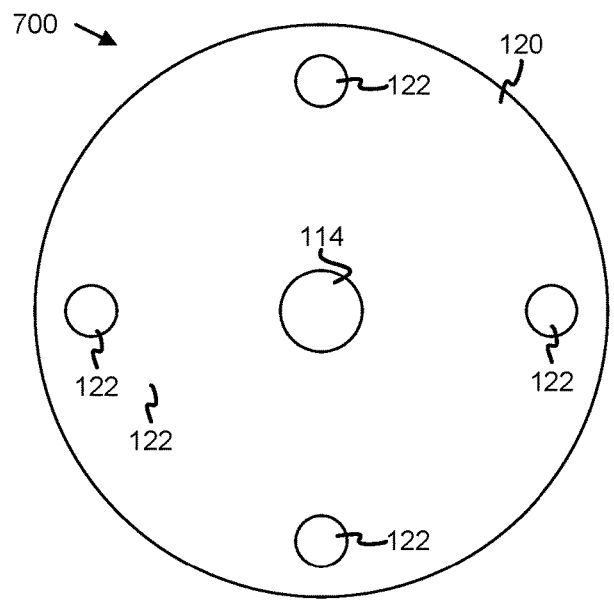
FIG. 7A is a front view illustrating one embodiment of a sensor plate.
Figure 7B:
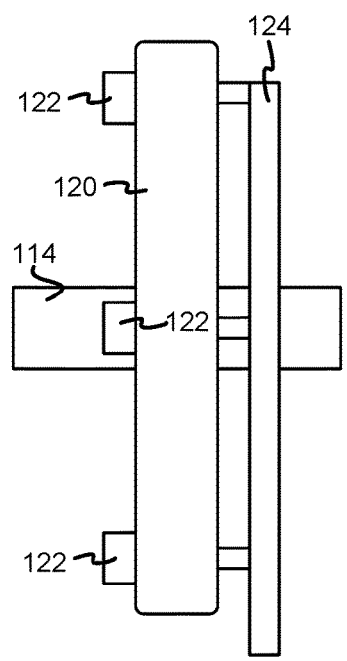
FIG. 7B is a side view illustrating a further embodiment of a sensor plate.

FIGS. 7A and 7B depict embodiments of a sensor plate 700. In one embodiment, the sensor plate may include the sensor plate 120, one or more sensors 122, or a sensor relay 124. In a further embodiment, the sensor plate may include an aperture and the axle 114 may protrude through the axle 114. In one embodiment, the sensor plate 120 may not couple to the axle 114, and, thus, may not rotate in response to the axle 114 rotating. In another embodiment, the sensor plate 120 may couple to the axle 114 and rotate in response to the axle 114 rotating. In one embodiment, the one or more sensors 122 may each include a Hall Effect sensor. In another embodiment, the one or more sensors 122 may each include a temperature sensor, infrared sensor, magnetic sensor, or another type of sensor capable of sensing the sensor trigger 118.

In one embodiment, interruption of the Hall Effect sensor, such as with a switch, interrupts the motor and is used for an emergency stoppage of the motor.

In one embodiment, each of the one or more sensors may include one or more solid-state components. In a further embodiment, the one or more sensors including solid-state components may include the one or more sensors 122 functioning for a pre-determined amount of time. For example, in one embodiment, the one or more sensors 122 may function for ten years. In one embodiment, the one or more sensors including solid-state components may include the one or more sensors 122 functioning for a pre-determined number of readings. For example, in one embodiment, the one or more sensors 122 may function for one billion readings of the sensor trigger 118.

In one embodiment, the sensor plate 120 is adjustable, either manually or electrically to control rpm and direction of the motor. By controlling the timing, either advancing or retarding the rpm and direction are controlled.

Figure 8:
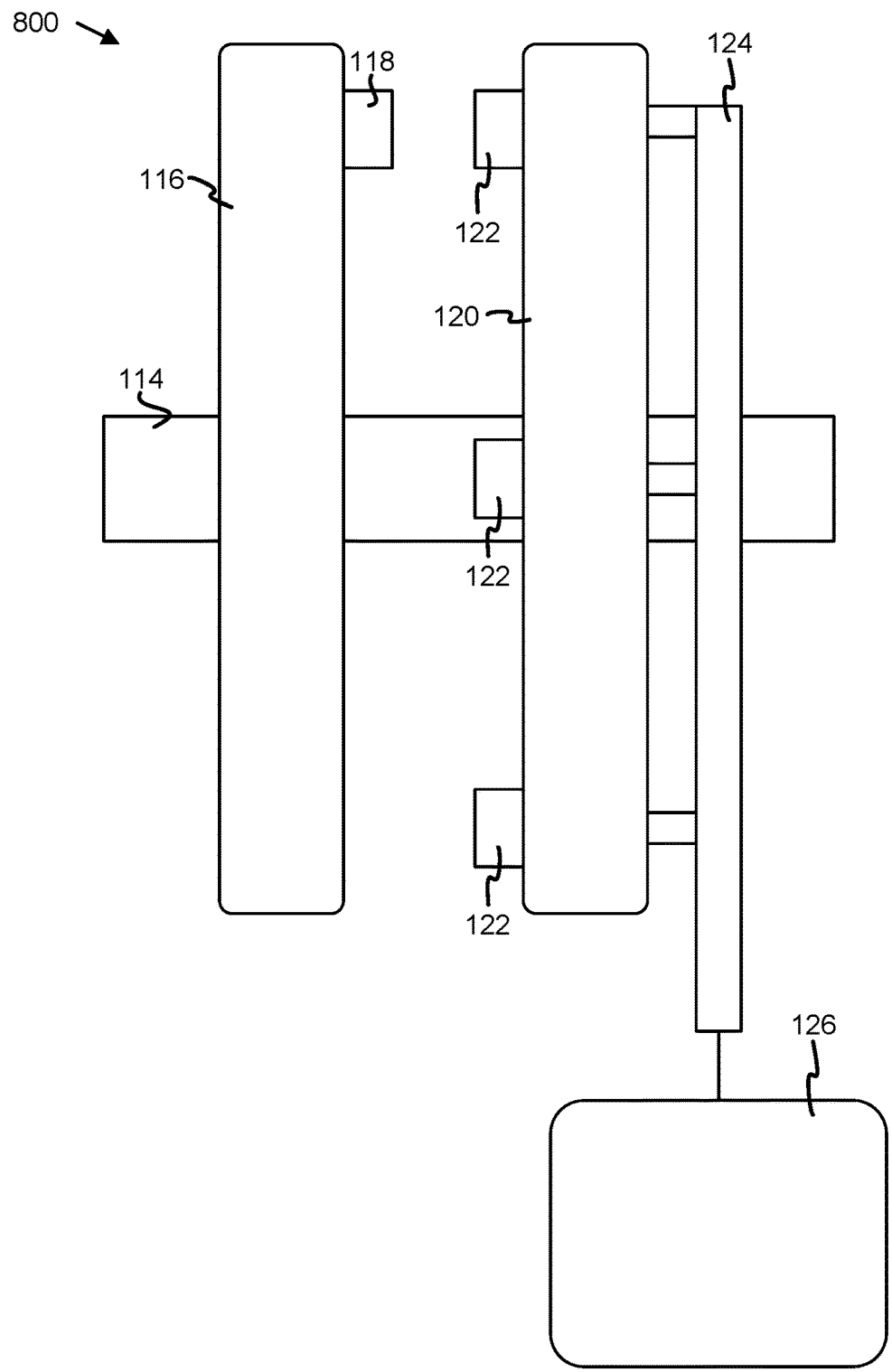
FIG. 8 is a side view illustrating one embodiment of a trigger wheel interacting with a sensor plate.

FIG. 8 depicts one embodiment of a system 800 for sensing rotation and the like. In one embodiment, the system 800 may include a trigger wheel (for example, the trigger wheel 600 of FIG. 6). In a further embodiment, the system 800 may include a sensor plate (for example, the sensor plate 700 of FIG. 7). In one embodiment, a sensor 122 sensing the sensor trigger 118 may include the sensor trigger 118 moving into a predetermined proximity of the sensor 122. For example, in one embodiment, a sensor 122 may include a Hall Effect sensor and the sensor trigger 118 may include a neo magnet. The trigger wheel 116 may rotate and may move the sensor trigger 118 such that the magnetic field produced by the sensor trigger 118 may contact the sensor 122. In response to the magnetic field of the sensor trigger 118 contacting the sensor 122, the sensor 122 may sense the sensor trigger 118. In response to the sensor 122 sensing the sensor trigger 118, the sensor 122 may send a signal through the sensor relay 124 to the timing control 126. In one embodiment, one or more components of the system 800 may include solid state components.

In one embodiment, the timing control 126 may receive one or more inputs from one or more components of the apparatus 100. In a further embodiment, the timing control 126 may output one or more outputs to one or more components of the apparatus 100. In one embodiment, the timing control 126 may receive one or more inputs from one or more sources external to the apparatus 100. In a further embodiment, the timing control 126 may send on or more outputs to one or more destinations external to the apparatus 100. In one embodiment, the one or more inputs or one or more inputs may include timing information.

In one embodiment, the timing control 126 may receive one or more inputs. In a further embodiment, the one or more inputs may include data input. For example, in one embodiment, the data input may include binary data for one or more computing devices or computing components. In one embodiment, the data may include electrical signals. In one embodiment, the timing control 126 may receive the one or more inputs from one or more cables, wires, or the like. In another embodiment, the timing control 126 may receive one or more mechanical inputs, for example, in some embodiments, a shaft turning, a lever moving, or the like.

In one embodiment, the timing control 126 may include one or more electrical devices, hardware modules, hardware circuits, hardware chips. In one embodiment, a module may be implemented as a hardware circuit comprising custom VLSI circuits or gate arrays, off-the-shelf semiconductors such as logic chips, transistors, or other discrete components. In another embodiment, a module may also be implemented in programmable hardware devices such as field programmable gate arrays, programmable array logic, programmable logic devices or the like. In another embodiment, a module may also be implemented in software for execution by various types of processors. In one embodiment, the one or more electrical devices, modules, circuits, chips, or the like may include one or more solid-state components.

In one embodiment, the timing control 126 may include one or more components that may process the one or more inputs. In a further embodiment, the processing may include processing information related to the timing of one or more components of the apparatus 100. In one embodiment, the timing control 126 may send output to one or more components of the apparatus 100. In a further embodiment, the output may include information determined from processing information related to timing of one or more components of the apparatus 100.

In one embodiment, the timing control 126 may include a mechanical timing control. For example, the timing control 126 may include a timing control similar to that of a vehicle such as a car, motorcycle, or the like. In one embodiment, the timing control 126 may include a combination of mechanical and software components.

In one embodiment, the signal from the one or more sensors 122 may include information about a component connected to the axle 114. In another embodiment, the signal may include information about a component connected to another part of an apparatus, such as the apparatus 100 of FIG. 1. For example, in one embodiment, the information may include a position of the sensor trigger 118 in relation to one or more sensors 122. For example, in one embodiment, the information of the signal may include that the sensor trigger 118 is in front of a certain sensor 122. In another embodiment, the information of the signal may include a rotational speed of a component such as the axle 114, the magnet wheel 108, the trigger wheel 116, or the like.

In a further embodiment, the signal may include other information about one or more components.

In one embodiment, information of multiple signals may be combined to determine information about one or more components. For example, in one embodiment, one signal may include information about the sensor trigger 118 moving into a proximity of the one or more sensors 122. In a further embodiment, the information may include one or more times that the sensor trigger 118 moved into proximity of the one or more sensors 122. In one embodiment, the timing control 126 may use the information that includes one or more times that the sensor trigger 118 moved into a proximity of the one or more sensors 122 to determine a rotational speed of the sensor trigger 118, the trigger wheel 116, the axle 114, or the like. In a further embodiment, the timing control 126 may receive one or more signals from a source external of a component of the apparatus 100.

In one embodiment, the timing control 126 may include a servomechanism ("servo"). In one embodiment, in response to the timing control 126 processing one or more signals received from one or more components (such as the components of the apparatus 100 of FIG. 1) or from an external source, the timing control 126 may send one or more signals to one or more components. For example, in one embodiment, the timing control 126 may send one or more signals to the magnet wheel 108. In response to the magnet wheel 108 receiving one or more signals from the timing control 126, the magnet wheel 108 may produce a burst of energy and increase the speed of the rotation of the axle 114. In a further embodiment, the timing control 126 may send one or more signals to the pulse device 102. In response to the pulse device 102 receiving one or more signals from the timing control 126, the pulse device 102 may increase or decrease the rate of speed at which the pulse device 102 pulses. In one embodiment, in response to the pulse device 102 receiving one or more signals from the timing control 126, the pulse device 102 may stop pulsing.

Figure 9:
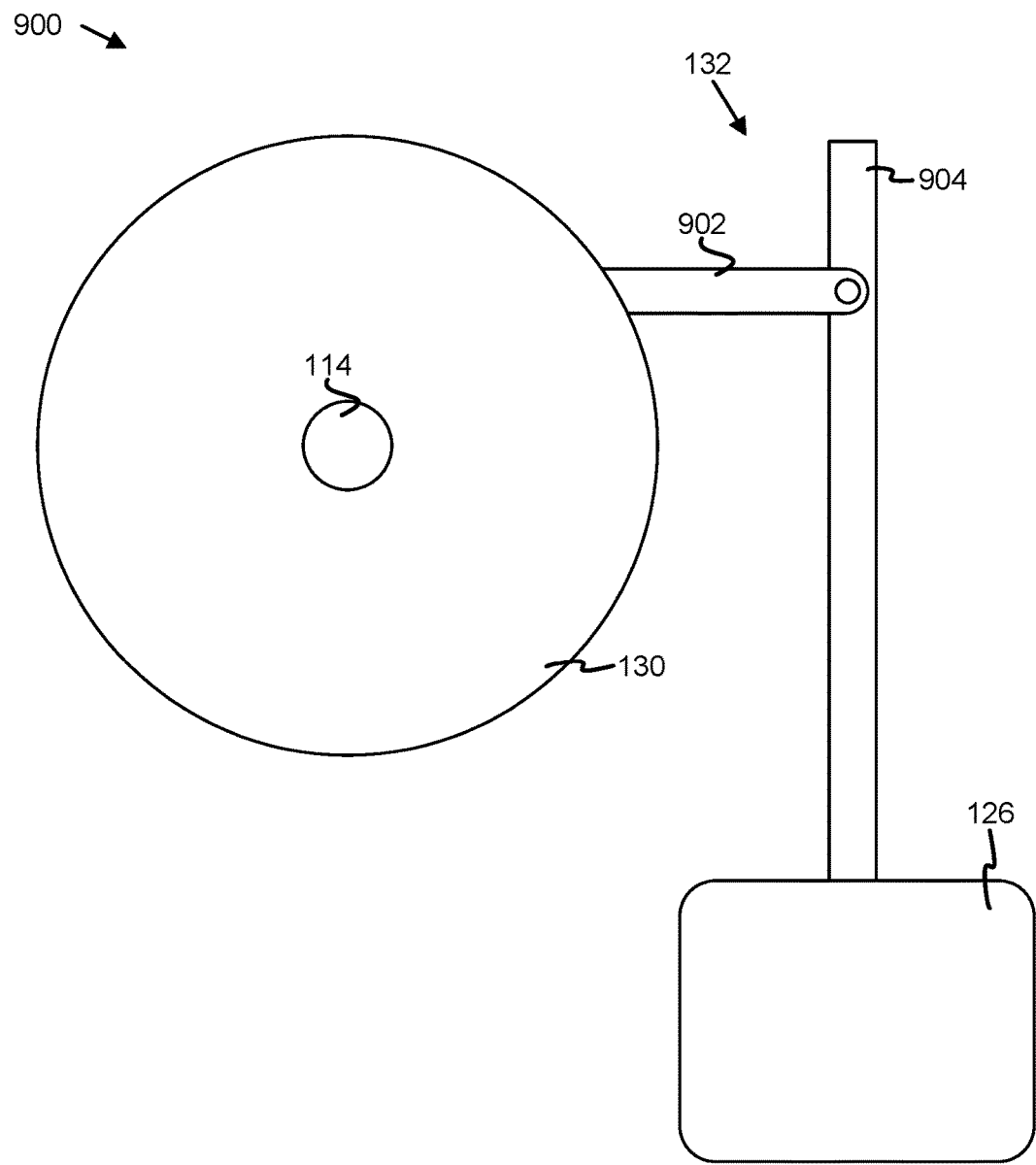
FIG. 9 is a front view illustrating one embodiment of a timing mechanism.

FIG. 9 depicts one embodiment of a timing mechanism 900. In one embodiment, the timing mechanism 900 may include the timing wheel 130 of FIG. 1. In a further embodiment, the timing mechanism 900 may include a connecting arm 902. In one embodiment, the timing mechanism 900 may include a timing arm 904. In a further embodiment, the timing arm 904 may couple to the timing control 126. In one embodiment, the timing wheel 130 may include an aperture and the axle 114 may protrude through the aperture. In a further embodiment, in response to the axle 114 rotating, the timing wheel 130 may turn.

In one embodiment, the connecting arm 902 may move in response to the timing wheel 130 rotating. In a further embodiment, the connecting arm 902 may move in response to the timing arm 904 moving. In a further embodiment, the timing arm 904 may move in response to the timing control 126 moving the timing arm 904. In one embodiment, the timing arm 904 may move in a reciprocating motion. In a further embodiment, the timing arm 904 may move in a reciprocating motion at a speed controlled by the timing control 126. In one embodiment, the timing arm 904 may move in response to the connecting arm 902 moving. In one embodiment, the timing mechanism may include a timing belt (not depicted). The timing belt may connect to the timing wheel 130. The timing belt may connect to a rotational mechanism, device, or the like that may determine the speed of the timing belt.

In one embodiment, the timing mechanism 900 may create resistance to the axle 114 rotating. In a further embodiment, the timing control 126 may send a signal to one or more components of the timing mechanism 900. The signal may include information relating to creating resistance to the rotation of the axle 114. For example, in one embodiment, the timing wheel 130 may include one or more brakes. The one or more brakes may include frictional brakes, pumping brakes, electromagnetic brakes, or the like. In a further embodiment, the timing control 126 may send a signal to the one or more brakes. In response to receiving the signal, in one embodiment, the one or more brakes may clasp around a disk of the timing wheel 130. The disk may include the timing wheel 130, a component of the timing wheel 130, or the like. In another embodiment, for example, the timing mechanism 900 creating resistance to the axle 114 rotating may include the timing control 126 slowing the rate of speed of the reciprocating motion of the timing arm 904. In response to the slowing of the reciprocating motion of the timing arm 904, the connecting arm 902 may slow its motion. In one embodiment, in response to the connecting arm 902 slowing, the connecting arm 902 may restrict the motion of the timing wheel 130. In response to the restriction of the timing wheel 130, in a further embodiment, the axle 114 may slow its rotation.

In one embodiment, the signal from the timing control 126 may determine a degree of resistance created by the one or more components of the timing mechanism 900. For example, in one embodiment, the signal may cause a brake to clasp around a disk of the timing wheel 130 to create a small amount of resistance. In one embodiment, the signal may cause a brake to clasp around a disk of the timing wheel 130 to create a large amount of resistance. In a further embodiment, the in response to different amounts of resistance applied to the rotating axle 114, the rotation of the axle 114 may slow at different speeds. For example, in one embodiment, a large amount of resistance may correspond with a rapid slowing of the rotation of the axle 114. In a further embodiment, a small amount of resistance may correspond with a slower slowing of the rotation of the axle 114.

In one embodiment, one or more components of the timing mechanism 900 may be a separate component from one or more components of the apparatus 100. In another embodiment, one or more components of the timing mechanism 900 may be built into one or more components of the apparatus 100. For example, in one embodiment, the timing mechanism 900 may be built into the trigger wheel 116. In another embodiment, the timing mechanism 900 may be built into the magnet wheel 108. In one embodiment, the timing mechanism 900 may be built into the generator wheel 134.

Figure 10:
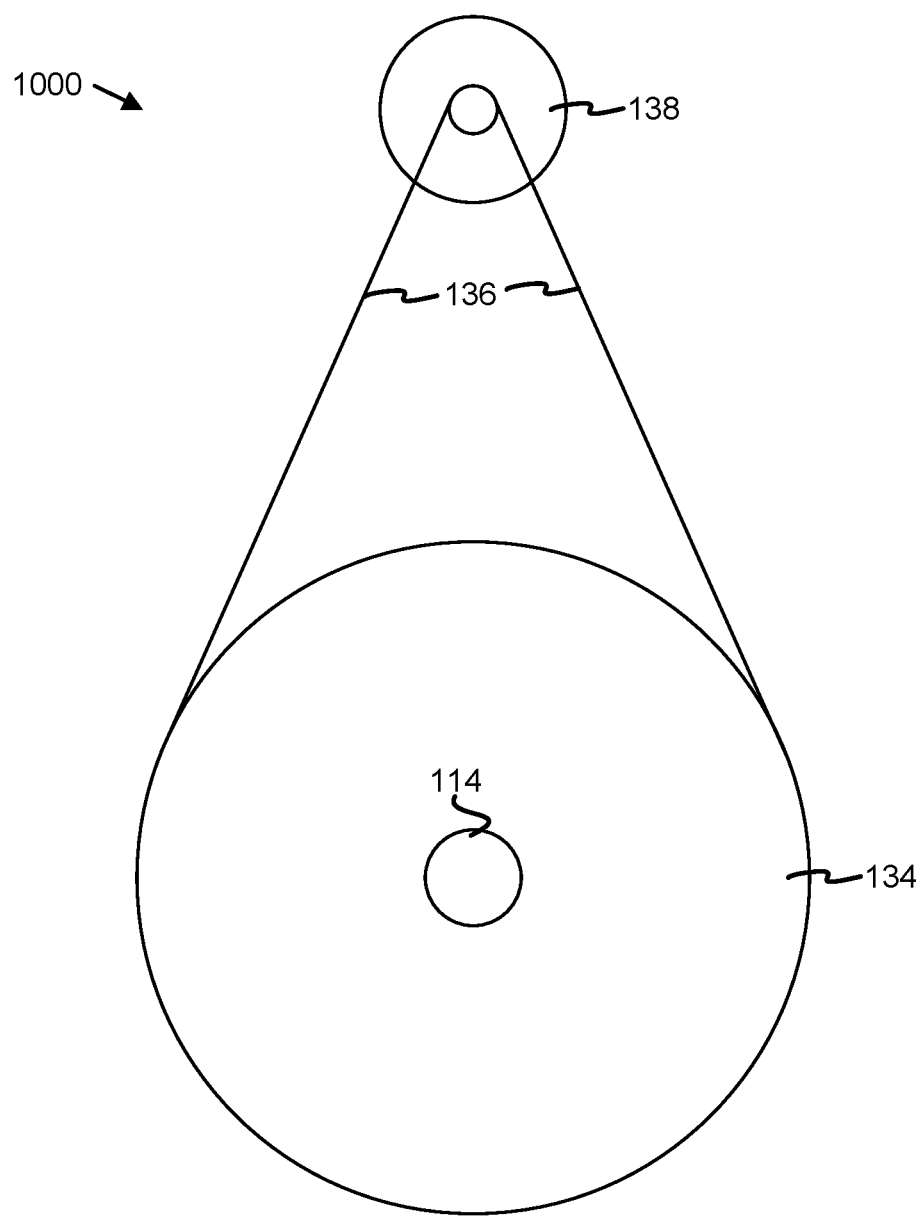
FIG. 10 is a front view illustrating one embodiment of a generator wheel.

FIG. 10 depicts one embodiment of a system 1000 for power generation. In one embodiment, the system 1000 may include the generator wheel 134. In a further embodiment, the system 1000 may include the generator belt 136. In a further embodiment, the system 1000 may include the generator 138. In one embodiment, the generator wheel 134 may include an aperture and the axle 114 may protrude through the axle 114. In a further embodiment, in response to the axle 114, the generator wheel 134 may turn. In one embodiment, the generator 138 may include may include a 12 volt generator. In another embodiment, the generator 138 may include a generator of another voltage.

In one embodiment, in response to the generator wheel 134 turning, the generator wheel 134 may drive the generator belt 136. The generator wheel 134 may drive the generator belt 136 in a variety of ways. In one embodiment, in response to the generator wheel 134 driving the generator belt 136, the generator belt 136 may turn a shaft on the generator 138. In one embodiment, the generator 138 may include another device capable of converting mechanical energy into electricity. In response to the generator belt 136 turning a shaft of the generator 138, in one embodiment, the generator may produce electricity. In one embodiment, the generator may store the electricity in an external source, such as a battery or the like. The external source may couple to one or more other components connected to the axle 114 or the like (such as the components of the apparatus 100 of FIG. 1) and delivery power to the components.

Furthermore, in some embodiments, the generator 138 may include a motor. In one embodiment, the motor may receive power from an external source (such as a battery, a solar panel, or the like) and turn a shaft coupled with the motor. In one embodiment, in response to the motor turning the shaft, the motor may drive the generator belt 136. In response to the motor driving the generator belt 136, the generator wheel 134 may turn. In some embodiments, in response to the generator wheel 134 turning, the axle 114 may rotate.

In one embodiment, the axle 114 may be in a state of rest and may include not rotating. In one embodiment, the generator 138 may include the motor as described above and the motor may receive power. In response to the motor receiving power, in one embodiment, the shaft of the motor may rotate and drive the generator belt 136. In response to the motor driving the generator belt 136, the generator wheel 134 may begin to turn. In response to the generator wheel 134 beginning to turn, the axle 114 may exit a state of rest and begin to rotate.

In another embodiment, the axle 114 may be in a state of rest and may include not rotating. In one embodiment, an external power source, for example, a battery, a solar panel, or the like, may supply power to one or more components of the apparatus 100 and, in response to the receiving power, the one or more components of the apparatus 100 may rotate the axle 114. For example, as described above, in one embodiment, the magnet wheel 108 for release of burst of energy and, in response to releasing the burst of energy, the magnet wheel 108 may being rotating and rotate the axle 114. In another embodiment, another wheel component or the like, such as the magnet wheel 108, the trigger wheel 116, the generator wheel 134, or another wheel not described in FIG. 1, may receive power from the external power source. In one embodiment, in response to the wheel component or the like receiving power, the wheel component or the like may rotate the axle 114. In one embodiment, the external power source may receive and store power from the generator 138.

In one embodiment, the generator 138 is used to start the motor. Providing a reverse polarity pulse to the generator 138 starts the motor rotating.

In one embodiment, the axle 114 rotating may rotate one or more external components. For example, in one embodiment, the axle 114 rotating may turn one or more belts, gears, wheels, or the like. The axle 114 rotating, in one embodiment, may provide mechanical energy to one or more components external to the apparatus 100. For example, in one embodiment, the apparatus 100 may provide mechanical energy to a vehicle. In another embodiment, the apparatus 100 may provide mechanical energy to a manufacturing or industrial machine. One of skill in the art will recognize other applications that the apparatus 100 may include or other devices, machines, or the like that the apparatus 100 may power. Furthermore, as discussed above, one or more components of the apparatus 100 may determine, at least in part, the rotational speed of the axle 114.

In one embodiment, the various components of the apparatus 100 may include components free of electromagnetic coils. In a further embodiment, the apparatus 100 being free of electromagnetic coils may include the apparatus 100 consuming little power. For example, in one embodiment, the apparatus 100 may consume 90% less energy than an electric motor that has the same energy output as the apparatus 100.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a pulse device comprising a magnet, wherein the pulse device is configured to move the magnet in a reciprocating motion;
   a magnet wheel comprising a magnet, wherein a magnetic field produced by the magnet of the pulse device repulses the magnet of the magnet wheel and turns the magnet wheel;
   an axle connected to the magnet wheel that rotates in response to the magnet wheel turning;
   a trigger wheel connected to the axle, wherein the trigger wheel comprises a magnet disposed a surface of the trigger wheel; and
   a sensor plate comprising a sensor that detects a proximity of a magnet of the trigger wheel.

2. The apparatus of claim 1, wherein the pulse device further comprises:
   an oscillator;
   a shaft coupled to the oscillator; and
   a lever comprising a first end and a second end, wherein the first end couples to the shaft and the second end couples to the magnet of the pulse device.

3. The apparatus of claim 1, wherein the magnet of the magnet wheel comprises a shield that covers a portion of a surface of the magnet.

4. The apparatus of claim 1, wherein a magnetic field produced by the magnet of the pulse device repulses the magnet of the magnet wheel in response to the magnet of the pulse device moving into a proximity of the magnet of the magnet wheel.

5. The apparatus of claim 1, further comprising a timing control connected to the sensor device, wherein the timing control is configured to detect, from the sensor device, a rotational speed of the axle.

6. The apparatus of claim 5, wherein the timing control, in response to detecting the rotational speed of the axle, is configured to adjust at least one of:
   a speed of the reciprocating motion of the pulse device; and
   a speed of rotation of a timing wheel connected to the axle, wherein the timing wheel is configured to adjust the speed of rotation of the axle in response to the timing control adjusting the speed of rotation of the timing wheel.

7. The apparatus of claim 1, further comprising a generator connected to the axle.

8. A system comprising:
   a pulse device comprising a magnet, wherein the pulse device is configured to move the magnet in a reciprocating motion;
   a magnet wheel comprising a magnet, wherein a magnetic field produced by the magnet of the pulse device repulses the magnet of the magnet wheel and turns the magnet wheel;
   an axle connected to the magnet wheel that rotates in response to the magnet wheel turning;
   a sensor device comprising:
      a trigger wheel connected to the axle, wherein the trigger wheel comprises a magnet disposed a surface of the trigger wheel, and
      a sensor plate comprising a sensor that detects a proximity of the magnet of the trigger wheel; and
      a timing control connected to the sensor device, wherein the timing control is configured to detect, from the sensor device, a rotational speed of the axle.

9. The system of claim 8, wherein the pulse device further comprises:
   an oscillator;
   a shaft coupled to the oscillator; and
   a lever comprising a first end and a second end, wherein the first end couples to the shaft and the second end couples to the magnet of the pulse device.

10. The system of claim 8, wherein the magnet of the magnet wheel comprises:
    a shield that covers a portion of the surface of the magnet; and
    a neodymium magnet.

11. The system of claim 9, wherein a magnetic field produced by the magnet of the pulse device repulses the magnet of the magnet wheel in response to the magnet of the pulse device moving into a proximity of the magnet of the magnet wheel.

12. The system of claim 8, wherein the timing control, in response to detecting the rotational speed of the axle, is configured to adjust at least one of:
    a speed of the reciprocating motion of the pulse device; and
    a speed of rotation of a timing wheel connected to the axle, wherein the timing wheel is configured to adjust the speed of rotation of the axle in response to the timing control adjusting the speed of rotation of the timing wheel.

13. The system of claim 8, further comprising a generator connected to the axle.

14. A method comprising:
    providing a pulse device comprising a magnet;
    providing a magnet wheel comprising a magnet;
    providing an axle connected to the magnet wheel;
    moving the magnet of the pulse device in a reciprocating motion;
    repulsing, in response to moving the magnet of the pulse device, the magnet of the magnet wheel;
    rotating the axle in response to the magnet wheel rotating;
    providing a sensor device comprising a trigger wheel connected to the axle, wherein the trigger wheel comprises a magnet disposed a surface of the trigger wheel and a sensor plate comprising a sensor; and
    in response to a magnet of the trigger wheel moving into proximity of the sensor, detecting a location of the magnet of the trigger wheel.

15. The method of claim 14, wherein the pulse device further comprises an oscillator, a shaft coupled to the oscillator, and a lever comprising a first end and a second end, wherein the first end couples to the shaft and the second end couples to the magnet of the pulse device, wherein:

moving the magnet of the pulse device in a reciprocating motion comprises moving the shaft in a reciprocating motion, in response to the shaft moving in a reciprocating motion, moving the lever in a pivoting motion, and in response to the lever moving in a pivoting motion, moving a magnetic field produced by the magnet of the pulse device into the magnetic field of the magnet of the magnet wheel; and repulsing the magnet of the magnet wheel comprises moving the magnetic field of the magnet of the pulse device into the magnetic field of the magnet of the magnet wheel.

16. The method of claim 14, further comprising:

providing a timing control connected to the sensor device; and detecting, from one or more detected locations of the magnet of the sensor device, a rotational speed of the axle.

17. The method of claim 16, wherein the timing control, in response to detecting the rotational speed of the axle, adjusts at least one of:

a speed of the reciprocating motion of the pulse device; and a speed of rotation of a timing wheel connected to the axle, wherein the timing wheel adjusts the speed of rotation of the axle in response to the timing control adjusting the speed of rotation of the timing wheel.

18. The method of claim 14, further comprising:

providing a generator connected to the axle; and in response to the axle rotating, generating electricity.

* * * * *